United States Patent
Bowers, Jr.

[15] 3,668,421
[45] June 6, 1972

[54] PHOTOFLASH LAMP ARRAY WITH AUTOMATIC SWITCHING

[72] Inventor: Harry J. Bowers, Jr., Mayfield Heights, Ohio

[73] Assignee: General Electric Company

[22] Filed: Dec. 4, 1970

[21] Appl. No.: 95,291

[52] U.S. Cl.................307/117, 315/323, 315/69, 240/37, 240/1.3, 431/95
[51] Int. Cl........................................H02j 1/00
[58] Field of Search..............315/323, 69; 240/37, 1.3; 431/93, 95; 307/117, 41

[56] References Cited

UNITED STATES PATENTS

| | | | |
|---|---|---|---|
| 3,562,508 | 2/1971 | Hoffacker | 240/1.3 |
| 3,473,880 | 10/1969 | Wick | 431/95 |
| 3,443,875 | 5/1969 | Herrmann | 240/1.3 |
| 3,267,272 | 8/1966 | Fischer | 240/1.3 |

Primary Examiner—Herman J. Hohauser
Attorney—Norman C. Fulmer, Henry P. Truesdell, Frank L. Neuhauser, Oscar B. Waddell and Joseph B. Forman

[57] ABSTRACT

An array of photoflash lamps is provided with a plurality of switching means for connecting successive lamps to a source of firing pulses. Each flash lamp, except the last to flash, has a switch pin adhered thereto by means of a protective lacquer coating. Each switch pin coacts with a switching means so that when a lamp flashes the heat thereof softens the lacquer and the switch pin becomes movable and causes the associated switching means to connect an unflashed lamp into the firing circuit so as to be flashed by the next firing pulse. An indicator pin is adhered by lacquer on the last lamp to be flashed, for actuating a last-flash indicator mechanism. A particularly advantageous arrangement is disclosed for a dual array having three lamps on each side, and also an improved three-prong connector arrangement for a dual array.

17 Claims, 8 Drawing Figures

PATENTED JUN 6 1972
3,668,421
Fig.1.
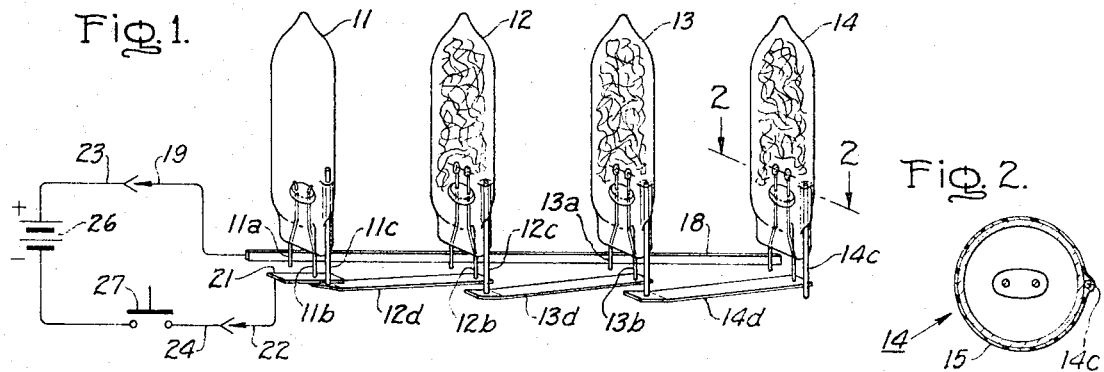
Fig.2.
Fig.3.
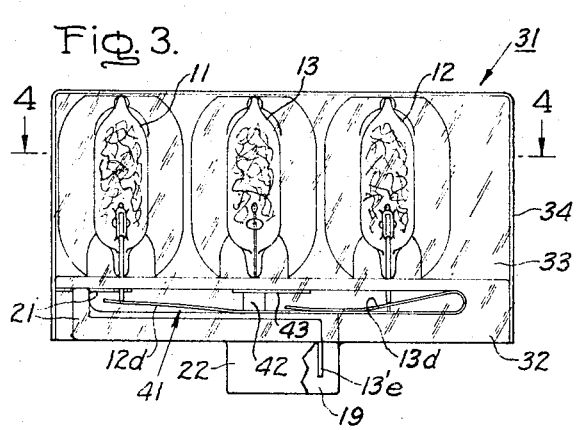
Fig.4.
Fig.6.
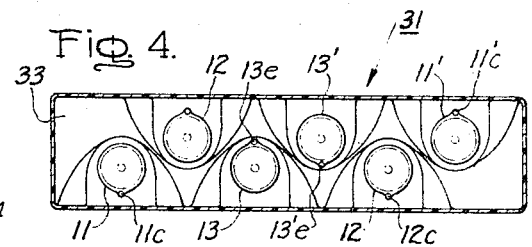
Fig.5.
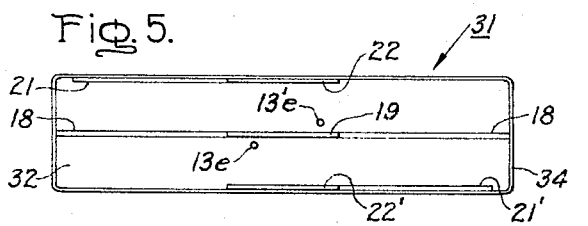
Fig.7.
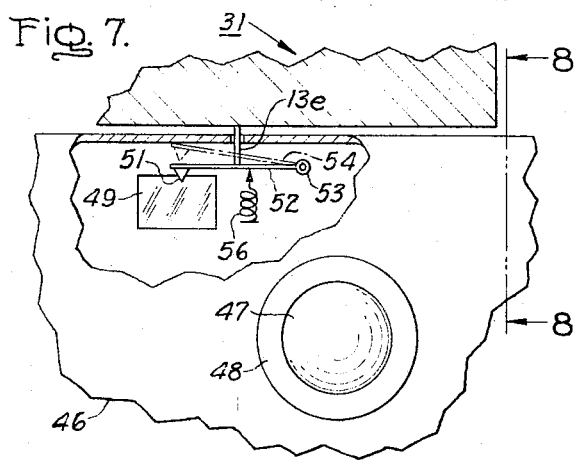
Fig.8.
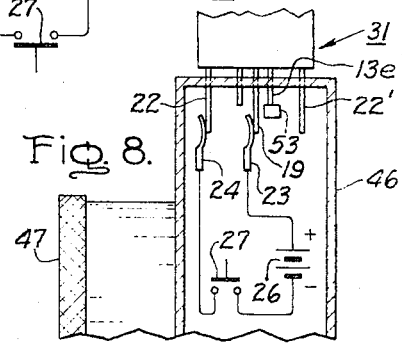
Inventor:
Harry J. Bowers, Jr.
by Norman C. Fulmer
His Attorney 3,668,421

PHOTOFLASH LAMP ARRAY WITH AUTOMATIC SWITCHING

CROSS-REFERENCE TO RELATED APPLICATION

U.S. patent application Ser. No. 95,102, filed concurrently herewith, of Kurt H. Weber, titled "Flash Indicator for Photoflash Lamps," assigned to the same assignee as the present invention.

BACKGROUND OF THE INVENTION

The invention is in the field of photoflash lamp arrays provided with switching means for causing a different lamp to be flashed upon each occurrence of a firing pulse produced in synchronism with the opening of a camera shutter. The invention is particularly directed to the type of photoflash lamp arrays in which the switching is accomplished automatically in response to heat generated by a lamp when flashing.

Numerous electronic circuits, and electromechanical switching arrangements, have been devised for causing a plurality of flash lamps to be successively flashed, one at a time, in response to firing pulses produced in synchronism with the opening of a camera shutter. The flash lamps are positioned in an array, with reflector means, for projecting light of all the flashes in the same relative direction (usually in a direction in which the camera is aimed, so as to illuminate a scene to be photographed), and therefore the flash lamp array need not be moved or rotated between pictures as is the case with so-called "flashcubes."

Various heat-responsive switching means have been proposed, for actuating switch connections in response to the heat inherently generated by flash lamps when they flash. The heat-responsive means may be a chemical or plastic material which melts, bends, moves, or deforms when heated by a flashing lamp, so as to cause switch contacts to close and electrically connect the firing pulse source to the next lamp to be flashed. Alternatively, the heat-responsive material may be a chemical or composition which is normally an insulator and which becomes electrically conductive when heated by a flashing lamp, thereby making electrical connection to the next lamp to be flashed.

The heat-responsive switching technique appears to have desirable theoretical advantages of simplicity, reliability, and low cost, although previously devised techniques have not fully achieved these advantages. The main problem areas have been the location of the heat-responsive material, and its coacting mechanism with switch contacts. If the heat-responsive material is spaced away from its associated flash lamp, the amount of heat reaching it is reduced due to the intervening space and therefore a more sensitive heat-responsive material must be used; the mechanism may fail if a foreign object should become lodged in the intervening space; and care must be taken that the sensitive spaced-away heat-responsive material will not be actuated by undesired heat sources such as may occur if the flash lamp array is laid on a hot radiator or placed in hot sunlight.

The thermal sensitivity and reliability is improved if the heat-responsive material is adhered to the surface of the flash lamp, where it receives heat directly from the lamp upon flashing; the required electrical wire, or resilient or spring-loaded switching lever, is adhered to or is in contact with the heat-responsive material on the lamp surface. However, such an arrangement is difficult and expensive to construct because of the switching mechanisms being interconnected between the lamp bulbs or between the lamp bulbs and the array housing, these connections being in addition to the electrical connections to the lead wires of the lamps. Also, there is danger of the switching connections becoming loosened from the lamp bulb surface whenever a lamp is jostled or vibrated.

Still another construction technique, which may be the ultimate insofar as heat-transfer is concerned, is to mount a heat-responsive switch inside each flash lamp, with a third lead-wire assembled in the lamp for connecting the internal switch to the next lamp to be flashed. Such a lamp construction increases the complexity and cost, especially for small-size flash lamps, and the presence of the thermal switch inside the lamp may undesirably alter the combustion characteristics of the lamp when flashed, in addition to being a potential source of undesired residual air or vapor contaminant within the lamp. Also, the required third lead wire adds to the cost of manufacturing the lamps and mounting them in the array housing.

SUMMARY OF THE INVENTION

Objects of the invention are to provide an improved automatically switchable array of flash lamps, and to provide a heat-operated switching arrangement which eliminates or reduces the above-described disadvantages of prior art arrangements. Other objects will be apparent.

The invention comprises, briefly and in a preferred embodiment, an array of a plurality of flash lamps, one of more normally open switches respectively positioned with respect to all but the last to be flashed of said flash lamps, and control pins, or switch pins, respectively adhered by heat-responsive material to all but said last to be flashed of the lamps and respectively engaging the switches to maintain them in normally open position. The heat-responsive material at each lamp is adapted to soften and permit movement of the adhered switch pin in response to heat generated upon flashing of the lamp thereby causing closure of the associated switch for connecting a next to be flashed lamp into the circuit. Further in accordance with the invention, a last-flash indicator is provided, and a control pin, or an indicator pin, is adhered by heat-responsive material to the last-to-flash lamp and is adapted to actuate the last-flash indicator upon flashing of said last-to-flash lamp. The heat-responsive material for adhering the control pins (i.e., the switch pins and indicator pins) may comprise the protective lacquer coating normally provided on the lamps. The invention further comprises a three-lamp array in which the center lamp is the last to flash and the switching means comprises a strip of metal shaped in a certain way to provide the movable portions of the switches. A dual-sided array is provided with only three connector prongs for plugging into a camera, one of the prongs being electrically common to both sets of lamps of the dual array, and a camera is provided with two electrical connectors such as to automatically activate only the lamps at the "front" side of the dual array.

BRIEF DESCRIPTION OF THE DRAWING

FIG. 1 is a perspective view of the essential elements of the invention in accordance with a preferred embodiment thereof, shown in the condition where the first lamp has been flashed and the second lamp is connected to be flashed when the next picture is taken;

FIG. 2 is a cross-sectional view of a photoflash lamp taken on the line 2—2 of FIG. 1;

FIG. 3 is a front view of a photoflash lamp array in accordance with a preferred embodiment of the invention, shown partly broken away to reveal the internal automatic switching mechanism;

FIG. 4 is a cross-sectional view taken on the line 4—4 of FIG. 3;

FIG. 5 is a bottom view of the flash array of FIG. 3;

FIG. 6 is a perspective view illustrating the fundamental elements of the three-lamp array of FIGS. 3-5;

FIG. 7 is a front view of the flash array plugged into a camera, shown partly broken away to reveal the last-flash indicator mechanism; and FIG. 8 is a cross-sectional view taken on the line 8—8 of FIG. 7.

DESCRIPTION OF THE PREFERRED EMBODIMENT

In the basic embodiment of the invention as shown in FIG. 1, a plurality of photoflash lamps 11, 12, 13, and 14 each is provided with a pair of filament or igniter lead wires $a$ and $b$, designated in the drawing for each lamp as 11$a$, 11$b$, etc.

These may be conventional type lamps, such as or similar to General Electric type AG–1 photoflash lamps, which are coated with a protective lacquer 15 to prevent shattering of the glass envelope in case the envelope should crack due to heat when the lamp is flashed. In accordance with the invention, each lamp is provided with a switch pin $c$, designated for the respective lamps as 11$c$, etc., which is adhered to the lamp by means of the normal lacquer coating 15. This is readily accomplished in manufacture, by holding the switch pin $c$ in position while the lamp is sprayed with, or dipped into, the lacquer. Alternatively, the lamps may be completely manufactured in the normal manner, and then the switch pins may be adhered thereto by means of a dab of lacquer or cement. The elongated switch pins $c$ may be made of metal, fiber, plastic, or other suitable material. In positioning them on the lamps during manufacture, it is important that they be positioned so as to extend a certain distance below the bulbs of the lamps. Alternatively, they may be positioned somewhat randomly, and then clipped or trimmed at the desired length. The bottom or free ends of the switch pins $c$ coact with switching means, as will be described subsequently.

The $a$ lead wires of the flash lamps are connected to a common electrical connector 18 which is electrically connected to a connector prong 19 of the photoflash array. The lead wire 11$b$ of the first flash lamp 11, is connected to an electrically conductive tab 21, which is connected to a connector prong 22 of the array of flash lamps. The connector prongs 19 and 22 are respectively adapted to engage electrical socket contacts 23 and 24 which are contained in a camera or a flash attachment adapted to receive the photoflash lamp array. The socket contacts 23 and 24 are connected to a source of electrical flash lamp firing pulses which are produced in synchronism with the opening of a camera shutter. One way of producing the firing pulses, as shown in FIG. 1, is by means of a battery 26 or other power source, and a normally open switch 27 adapted to become closed momentarily in synchronism with the opening of a camera shutter. Alternatively, the well known battery-capacitor type of firing voltage supply may be used, in conjunction with a camera shutter switch adapted to be momentarily closed in synchronism with the opening of the camera shutter. Another way of producing the firing pulses is by means of a piezoelectric element arranged to be stressed by a mechanism each time the shutter is opened, thereby producing a firing pulse (without the necessity of a battery) in synchronism with each opening of the camera shutter.

A plurality of resilient conductor strips $d$ are respectively connected to the lead wire $b$ of all but the first lamp 11, the free ends thereof being urged towards electrical contact with the lead wire connection of the preceding lamp, but held in spaced-apart relationship thereto by means of the free end of the switch pin $c$ of the preceding lamp when the photoflash array is in its initial unused condition. For example, as shown in FIG. 1, the first flash lamp 11 has been flashed, in response to a firing pulse generated by momentary closure of the switch 27 in synchronism with the opening of a camera shutter, this firing pulse having been fed directly to the first lamp 11 via the connectors 18 and 21. Upon flashing of the first lamp 11, its lacquer coating became heated, and softened sufficiently for the switch pin 11$c$ to become loosened or movable and permit the resilient switch strip 12$d$ to move its free end into electrical contact with the first contact tab 21, thereby placing the second lamp 12 directly into the circuit so as to be in condition to receive the next occurring firing pulse. Similarly, when the second lamp 12 is flashed by a firing pulse, the heat of the flashing softens the lacquer coating thereby loosening the switch pin 12$c$ sufficiently so that it is movable and permits the resilient contact strip 13$d$ to move so that its free end comes into contact with the previous contact strip 12$d$, thereby placing the third lamp 13 into the electrical circuit and in condition to receive the next occurring firing pulse. The foregoing sequence repeats, automatically, until all of the lamps have been flashed. Each firing pulse is of short duration so as to be mostly dissipated in a lamp being flashed prior to the aforesaid automatic switching to the next lamp, whereby a single lamp is flashed per firing pulse.

It will be noted that the last lamp 14 need not be provided with a switch pin 14$c$, since there are no subsequent lamps that need to be conditioned for subsequent flashing. However, for manufacturing purposes, it may be more economical to provide a switch pin on the last lamp of the array, so that all lamps will be manufactured identically. As will be subsequently described, in accordance with a further feature of the invention, the last to be flashed lamp is provided with an indicator pin, similar to the switch pin 14$c$, which functions to actuate a last-flash indicator in the camera.

Since the switch pin arrangement, for actuating the switching mechanisms, is attached to its respective flash lamp during manufacture, and need not be directly attached nor connected to the next succeeding lamp, it will be apparent that each lamp may be readily handled and inserted into the lamp array housing with substantially the same ease and speed as conventional lamps.

The foregoing construction, in accordance with the invention, not only is readily manufacturable at low cost, but is extremely reliable against accidental operation of the switches due to jostling or vibration of the lamp array, since the switch pins $c$ extend in a direction parallel to the lead wires $a$ and $b$, and the slight upward pressure on the switch pins by the resilient strips $d$ is readily accommodated and restrained by the attachment of the leads $a$ and $b$; i.e., the attachment of the lead wires $a$ and $b$ of each lamp readily secures the lamp against the slight force exerted against the switch pin $c$ by the resilient strip $d$, the lead wires thus being in slight tension and the switch pins being in slight compression, whereby the switch pins readily hold their coacting switch means in open condition until the lamp is flashed.

In the three-lamp dual array arrangement shown in FIGS. 3–6, three lamps 11, 12, and 13 of the front array, and three lamps 11′, 12′, and 13′ of the rear array, are positioned with the lamps of each array in linear planar alignment as shown, with respect to and within a housing 31 comprising a base portion 32 provided with slots and openings for the metal strips of the switch mechanism as will be described, and a reflector arrangement 33 providing individual curved reflector surfaces respectively for the individual lamps, for directing the light therefrom in a desired pattern. The lamps 11–13, and 11′–13′, the base 32 and its contained switching mechanism, and the reflector arrangement 33, are enclosed and held together by means of a protective transparent cover member 34, which may be tinted with a blue color to provide correct daylight color correction for the flash lamps.

The connector prong 19 is common to both sides of the lamp array, and is integral with the connector strip 18 which extends from both sides thereof and is positioned in a lengthwise groove in the base 32 of the array, as best shown in FIG. 5. The $a$ lead wires of the six lamps of the array may be wedge against the conductor strip in the base 32, thus providing adequate mechanical and electrical connection. Alternatively, the $a$ lead wires of the lamps may be welded or soldered to the conductor strip 18.

The connector prong 22 is centered along the base of the array near the front thereof, with the connector tab 21 extending integrally therefrom and positioned in a groove in the base 32 toward the left of the prong 22, and terminating adjacent the lead wire 11$b$ of the first lamp 11, to which it is electrically and mechanically attached as by soldering, welding, or by being wedged together in a slot in the base 32. Similarly, a second contact prong 22′ is positioned at the rear center of the array housing 31, the conductor tab 21′ extending integrally therefrom and being positioned in the slot in the base 32, toward the opposite side from the front connector tab 21. The end of the connector tab 21′ is connected to the lead wire 11 $b$′ of the first lamp 11′ at the rear of the array. Thus, with the connector prongs 22 and 22′ in symmetrical spaced alignment with respect to the common connector prong 19, the array may be plugged into a camera or flash adaptor unit with either the lamps 11, 12, and 13 facing frontwardly, or the lamps 11', 12', and 13' facing frontwardly. As will be described later, only the front-facing array of lamps is electrically connected into the actuating circuit.

The resilient connector strips 12d and 13d shown in the basic embodiment of FIG. 1, are formed from a single strip 41 of resilient metal in the embodiment of FIGS. 3–6, this single resilient strip being bent approximately half way back upon itself, as shown, to form a portion 12d, for connecting the lamp 12 to the firing pulse source after the first lamp 11 has been flashed, and a portion 13d for connecting the last lamp 13 to the firing pulse circuit after the second lamp 12 has been flashed. This folded double-purpose strip 41 is positioned in an opening in the base 32, out of electrical contact with the common connector strip 18 and the first lamp connector tab 21. It may be held in place by means of a spacer wedge member 42, which also holds in place a contact tab 43 for the lead wire 13b of the last-to-flash lamp 13, as shown.

As is evident from FIGS. 3 and 6, the first firing pulse will be directly connected to the filament lead wires of the first lamp 11, thereby flashing the first lamp, allowing its switch rod or pin 11c to loosen due to heat of the flash and hence permitting the resilient switch strip 12d to close into electrical contact against the connector tab 21, thereby connecting the second lamp 12 into the firing circuit. Thus, the next-to-occur firing pulse will flash lamp 12, whereupon its switch pin 12c will loosen, due to the attachment lacquer or cement softening due to heat from the flash, and the folded end portion 13d of the resilient strip 41 will move into electrical contact with the connection tab 43 for the last lamp 13. Thus, upon occurrence of the third firing pulse, the last lamp 13 will flash. Upon turning the array around and reinserting it into the camera or flash adapter unit, the "rear" lamps 11', 12', and 13' will face frontwardly and will be ready for sequential flashing. The last-to-flash lamps 13 and 13', of each side of the array, are positioned near the center of the array, and each is provided with a last-flash indicator pin 13e and 13'e, respectively.

The switch pins c extend downwardly from the front surface of the flash lamps 11, 12, 11', and 12', as shown, so as to extend into proper contact relationship with the respective switching mechanisms. The indicator pins e, however, extend downwardly from the "rear" surfaces of the lamps 13 and 13', as shown, through openings in the base portion 32 of the array 31, and downwardly from the bottom of the base portion 32. Indicator pin 13e extends downwardly from the base portion 32, in close parallel relationship to the common connector prong 19, between the prongs 19 and 22', and the indicator pin 13'e extends downwardly in parallel adjacency to the common connector prong 19, between the prongs 19 and 22, as shown clearly in FIG. 5. The indicator pins e, being close to the connector prong 19, and being between the prong 19 and the outer connector prongs 22 and 22', are protected from physical damage.

The last-flash indicator pins 13e and 13'e function to actuate a last-flash indicator mechanism in a flash attachment, or a camera, as shown in FIGS. 7 and 8. In FIG. 7, a dual flash lamp array 31 is shown inserted into a camera 46 provided with a lens 47 and a shutter mechanism 48, which may be a between-the-lens type, or a behind-the-lens type such as a focal plane shutter, the flash initiating switch 27 being incorporated with the shutter mechanism in conventional manner. The camera 46 also is provided with a viewfinder 49, which may be a direct view type, or a reflecting prism type such as is used in reflex cameras. The photoflash array 31 in FIG. 7 is shown as a cross-sectional view, so as to omit showings of the connector prongs 22 and 19, and the indicator pin 13'e, so that the indicator pin 13e is clearly shown as projecting downwardly from the array 31 and through a suitable opening in the top of the camera 46. The camera 46 is provided with a last-flash indicator "flag" 51, attached to the end of a last-flash indicator arm 52 which is pivoted at its other end 53 with respect to the camera body 46. Thus, the indicator arm 52 may swing vertically about the pivot 53, so that the last-flash indicator flag 51 may be either visible in the viewfinder 49, or will be non-visible when swung upwardly as indicated by the dashed line 54 due to an upward urging by a compression spring 56.

When the flash array 31 is plugged into the camera 46, the last-flash indicator pin 13e presses the last-flash indicator arm 52 downwardly so that the last-flash indicator flag 51 is visible in the viewfinder 49, thus indicating to the user that the last flash lamp on the front side of the array has not yet been flashed. When the last lamp 13 is flashed, its indicator pin 13e becomes loosened due to the heat of the flashing partially melting the lacquer or other means of attachment of the pin e to the lamp 13, whereby the pin 13e becomes movable and allows the spring 56 to force the last-flash indicator arm 52 upwardly to the position 54 so that the last-flash indicator flag 51 disappears from view in the viewfinder 49, thus indicating that the last lamp has been flashed on the front side of the array 31. Also, it will be noted, non-visibility of the last-flash indicator flag 51 also indicates the absence of a flash array in the camera 46. In summary, if the flag 51 is visible, it indicates that a flashable flash bulb is in position to be flashed, and, if not visible, it indicates lack of flashability due to absence of a flash array or due to all "front" lamps having been flashed.

As shown in FIG. 8, when an array 31 is plugged into the camera 46, the common socket contact 23 electrically engages the common connector prong 19, irrespective of whether the first or second side of the dual array is facing frontwardly of the camera. The other socket contact 24, however, is positioned so that it engages electrically only the outer prong, either 22 or 22', which is toward the front of the camera 46. Suitable openings are provided in the top of the camera 46 to receive the three connector prongs 19, 22, and 22' of the flash lamp array. Since the contact prongs 19, 22 and 22', and the indicator pins 13e and 13'e are arranged symmetrically, the dual flash lamp array 31 can be plugged into the camera (or a flash adaptor) with either array of flash lamps facing frontwardly, and only the front-facing array will be connected into the firing pulse circuit by means of the socket contacts 23 and 24. The array can be removed after flashing some, or none, of the lamps, and reinserted later with either side facing frontwardly, and more flash pictures can then be taken until the last-flash indicator 51 indicates absence of a flashable lamp in the front array. These principles of automatic control such as switching to an unflashed lamp, last-flash indication, the use of control pins (such as switch pins c and indicator pins e) adhered to the lamps, and three-prong dual reversible arrays, can be applied to arrays having any desired numbers of flash lamps.

While a preferred embodiment of the invention, and modifications thereof, have been shown and described, other embodiments and modifications thereof will become apparent to persons skilled in the art, and will fall within the scope of invention as defined in the following claims.

What I claim as new and desire to secure by Letters Patent of the United States is:

1. A photoflash lamp adapted to actuate control means upon flashing, wherein the improvement comprises an elongated control pin positioned with at least a portion of the length thereof parallel to and alongside the surface of said lamp and adhered to said lamp by means of heat-responsive material adapted to soften from heat generated by the lamp when flashed thereby permitting sliding movement of said control pin with respect to said surface of the lamp.

2. A photoflash lamp as claimed in claim 1, in which said heat-responsive material comprises a lacquer coating on said lamp and which also functions as a safety coating to reduce likelihood of the lamp shattering upon flashing.

3. A photoflash lamp as claimed in claim 1 in combination with said control means, wherein said control means comprises a switch means positioned with respect to said lamp and held in electrically open position by said control pin, said switch means being adapted to move into electrically closed position upon said control pin becoming movable when said lamp is flashed.

4. A photoflash lamp as claimed in claim 1, in which the lamp is provided with a pair of lead wires extending in a given direction therefrom, and in which said control pin extends from said lamp in said given direction.

5. A photoflash lamp as claimed in claim 4 in combination with said control means, wherein said control means comprises a movable member, means urging said movable member to move from a first position to a second position, and wherein means are provided to hold said photoflash lamp by said lead wires thereof, said photoflash lamp being positioned so that the end of said extending control pin engages axially against said movable member to hold it in said first position, thereby to permit said movable member to move to said second position upon flashing of said lamp.

6. A photoflash lamp array comprising a plurality of photoflash lamps, connection means adapted to connect a first one of said photoflash lamps to a source of firing pulses, a plurality of normally open switches respectively positioned with respect to all but a last of said photoflash lamps and adapted upon closing to connect a next successive one of said photoflash lamps to said connection means, means respectively urging said switches into closed position, and a plurality of elongated switch pins respectively positioned with respect to all but said last of the photoflash lamps with at least a portion of the lengths thereof parallel to and alongside the surfaces of the respective lamps and adhered to the lamps by means of heat-responsive material and extending into engagement with the respective switches to maintain them in normally open position, said heat-responsive material being adapted to soften and permit sliding movement of the adhered switch pin with respect to the surface of the lamp in response to heat generated upon flashing of the lamp thereby permitting closure of the associated switch.

7. A photoflash lamp array as claimed in claim 6, in which said last photoflash lamp is provided with an indicator pin adhered thereto by means of heat-responsive material adapted to soften and permit movement of said indicator pin in response to heat generated upon flashing of said last lamp, said indicator pin being adapted to actuate a last-flash indicator upon flashing of said last photoflash lamp, said photoflash lamps being mutually positioned in substantially linear planar alignment, and said last photoflash lamp being positioned substantially at the center of said plurality of photoflash lamps, said array including housing means containing said photoflash lamps and said switches, said housing means being provided with an opening to the exterior thereof, and said indicator pin being positioned to project through said opening and extend exteriorly of said housing means.

8. A photoflash lamp array as claimed in claim 7, in which said pins are substantially parallel to each other, in which said switch pins are mutually positioned in substantially planar alignment, and in which said indicator pin is positioned out of said planar alignment of the switch pins.

9. A photoflash lamp array as claimed in claim 7, including at least one electrical connection prong extending from said housing means in parallel adjacency to, and at least as far as, said indicator pin, thereby protecting said indicator pin from being damaged.

10. A photoflash lamp array as claimed in claim 7, in which said plurality of photoflash lamps and switches are positioned near one side of said housing means, and including a second plurality of photoflash lamps and switches positioned near the reverse side of said housing means and arranged similarly to said first-mentioned photoflash lamps and switches, a first electrical connector provided on said housing means and electrically connected to both of said pluralities of photoflash lamps, a pair of additional electrical connectors provided on said housing means so as to symmetrically flank said first electrical connector, and means respectively connecting said additional electrical connectors to said first photoflash lamp of each said plurality thereof, whereby said dual array is provided with only three electrical connectors.

11. A photoflash lamp array as claimed in claim 10, in which said electrical connectors extend mutually parallel from said housing means, and in which said indicator pins of the two pluralities of lamps respectively extend between said first electrical connector and said pair of additional electrical connectors, said indicator pins being symmetrically located with respect to said first electrical connector.

12. A photoflash lamp array comprising first, second, and third photoflash lamps positioned in linear planar alignment in the named order, each of said lamps having first and second lead wires extending therefrom in a given direction, first connection means connecting said first lead wires electrically together and adapted to be connected to a source of firing pulses, second connection means electrically connected to the second lead wire of the first lamp and adapted to be connected to said source of firing pulses, elongated switch pins respectively positioned with at least portions of the lengths thereof parallel to and alongside the surfaces of said first and third lamps and adhered to the lamps by means of heat-responsive material adapted to soften from heat generated by the lamp when flashed thereby permitting sliding movement of the switch pin with respect to the surface of the lamp, said switch pins extending from said first and third lamps in said given direction, a switch member of elongated resilient electrically conductive material bent back upon itself approximately half way and positioned so that the longer free end thereof is urged in a direction to become electrically connected with said second conduction means and so that the shorter free end thereof is urged in a direction to become electrically connected with the second lead wire of said second lamp, and means electrically connecting the second lead wire of said third lamp to said switch member, said switch pin of the first lamp being positioned to hold said longer free end of the switch member away from electrical connection with said second conductor prior to flashing of said first lamp, and said switch pin of the third lamp being positioned to hold said shorter free end of the switch member away from electrical connection with said second lead wire of the second lamp prior to flashing of said third lamp.

13. A photoflash lamp array as claimed in claim 12, including an indicator pin adhered to said second lamp by means of heat-responsive material adapted to soften from heat generated by the lamp when flashed thereby permitting movement of the indicator pin, said indicator pin extending from said second lamp in said given direction and adapted to actuate a last-flash indicator when said second lamp is flashed.

14. A photoflash lamp array as claimed in claim 13, in which said pins are substantially parallel to each other, in which said switch pins are mutually positioned in substantially planar alignment, in which said indicator pin is positioned out of said planar alignment of the switch pins, and in which said indicator pin extends from said second lamp to a point beyond the position of said switch member.

15. A dual photoflash lamp array unit having a first array of photoflash lamps arranged to project light frontwardly from one side of the array unit and a second array of photoflash lamps arranged to project light rearwardly from the opposite side of said array unit, switching means associated with said first array of photoflash lamps for causing the lamps to be flashed sequentially by firing pulses, switching means associated with said second array of photoflash lamps for causing the lamps to be flashed sequentially by firing pulses, three electrical connector means positioned on a side of said array unit between said one side and said opposite side thereof, first and second ones of said connector means being arranged symmetrically with respect to the third connector means, means electrically connecting said first connector means to said first array, means electrically connecting said second connector means to said second arrays, and means electrically connecting said third connector means to both of said first and second arrays.

16. A dual photoflash lamp array unit as claimed in claim 15 in combination with a camera or flash adaptor, said camera or flash adaptor being provided with a pair of electrical connector means for providing firing pulses to said array unit and positioned to respectively contact said first and third connector means when said array unit is positioned with respect to said camera or flash adaptor with said one side of the array unit facing a given direction and to respectively contact said second and third connector means when said array unit is positioned with respect to said camera or flash adaptor with said opposite side of the array unit facing said given direction.

17. A combination as claimed in claim 16, in which said three electrical connector means comprise three prongs extending mutually parallel from said array unit, and in which said camera or flash adaptor is provided with three openings for receiving said three prongs, the first and third of said openings being symmetrical with respect to the second of said openings whereby said prongs can be plugged into said openings in two alternative mutually reverse orientations with either said one side or said opposite side of the array unit facing said given direction, said pair of electrical connector means of the camera or flash adaptor being aligned with said first and second openings, respectively.

* * * * *